C. H. McLAUGHLIN.
AUXILIARY CONNECTION FOR CAR COUPLINGS.
APPLICATION FILED SEPT. 28, 1907.
1,003,771.
Patented Sept. 19, 1911.
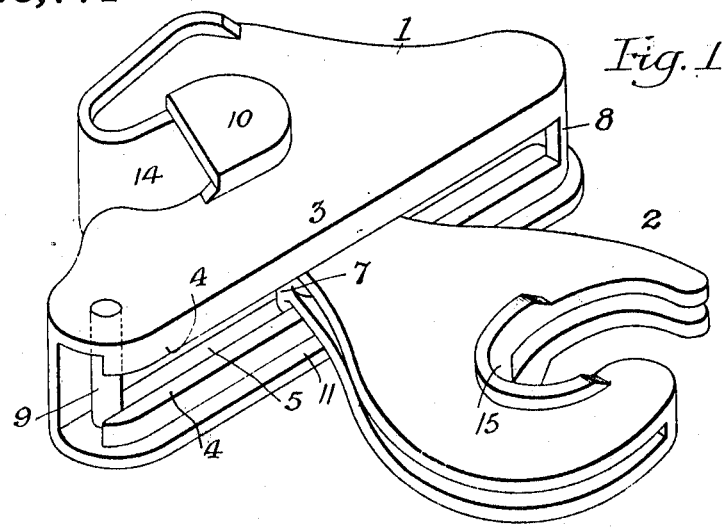
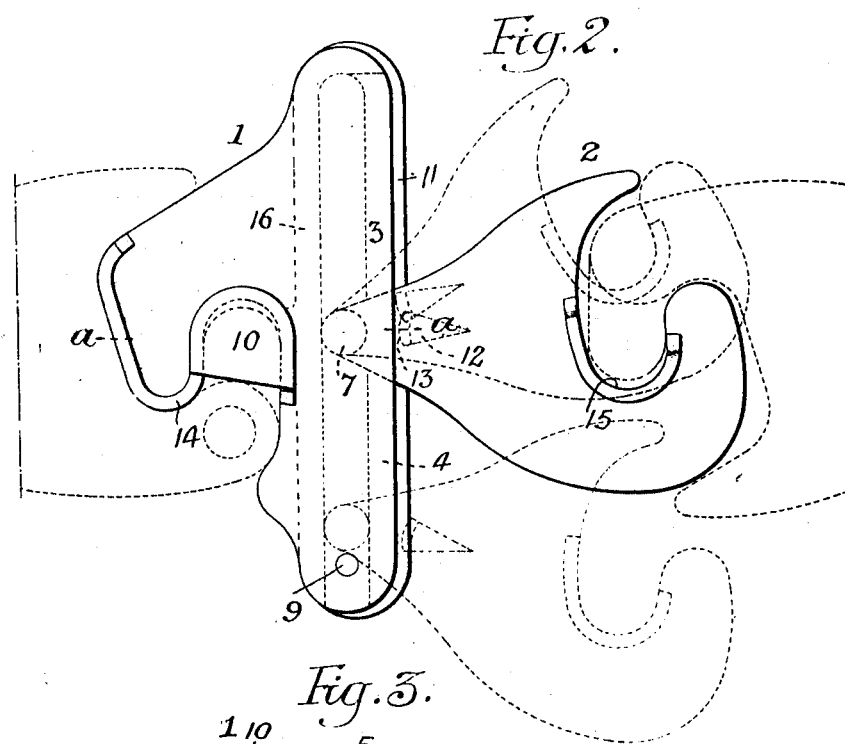
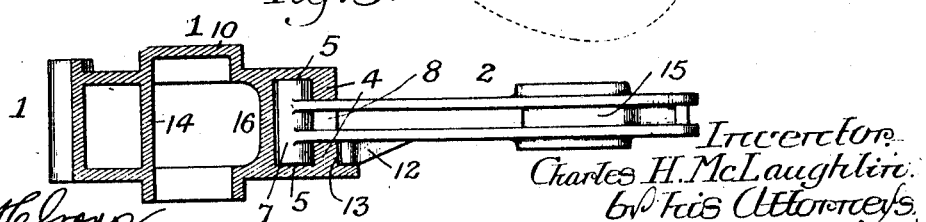

UNITED STATES PATENT OFFICE.

CHARLES H. McLAUGHLIN, OF PHILADELPHIA, PENNSYLVANIA.

AUXILIARY CONNECTION FOR CAR-COUPLINGS.

1,003,771.  Specification of Letters Patent.  Patented Sept. 19, 1911.

Application filed September 28, 1907. Serial No. 395,043.

*To all whom it may concern:*

Be it known that I, CHARLES H. MCLAUGHLIN, a citizen of the United States, residing in Philadelphia, Pennsylvania, have invented certain Improvements in Auxiliary Connections for Car-Couplings, of which the following is a specification.

My invention relates to auxiliary connections for car couplings of the character disclosed in my former Patent, No. 742,720, dated October 27, 1903, and the patent of W. N. Shephard, No. 746,588, dated December 8, 1903; the object of my present invention being to provide an auxiliary connection of this type available for use with the vertical plane couplings of adjacent cars that may be offset laterally or vertically with respect to each other so as to preclude any possibility of effecting a connection with the use of an ordinary auxiliary connection wherein the coupling parts bear relatively fixed position with relation to each other.

In the accompanying drawings: Figure 1 is a perspective view of a form of auxiliary connection for car couplings which has been designed for the purpose of connecting the ordinary vertical plane-couplings of a pair of cars when said couplings are offset laterally with respect to each other; Fig. 2, is a plan view illustrating my improved auxiliary connection in place coupled to an ordinary form of coupler head, indicated by dotted lines at the left of the view; the movable portion of such connection being shown coupled to an ordinary coupling head, also shown in dotted lines, and such movable member being also shown by dotted lines in other positions that it may assume; and Fig. 3 is an elevation, partly in section, on the line *a—a*, Fig. 2.

In the use of auxiliary connections for car couplings it frequently happens that the cars to be coupled are lying on tracks of such radius as to throw the coupling heads carried by the same so far out of line as to prevent practical connection therewith, and when connections of the type shown in the Shephard structure are employed, which are of such a character as to be capable of effecting such coupling, there is the danger of bending the bar when the pushing or pulling strain is applied in moving the cars.

The object of my invention is to employ a structure such as illustrated in Figs. 1, 2 and 3, wherein a head such as 1 may be attached directly to a coupling of the Master Car Builders or Janney type and held thereto in substantially rigid relationship. Carried by the head 1 is a movable head 2 designed for engagement with the coupling of the other car, and such engagement may be accomplished automatically.

The front or buffing portion of the head 1 is elongated laterally as indicated at 3, and the top and bottom webs of such elongated portion are provided with ribs 4 forming grooves 5 adapted to receive the rear end of the coupling 2, which is shaped to form a pivot pin 7. By this means the head 2 is slidably movable the full length of the coupling 1, and is prevented from dislodgment by a web 8 at one end and a pin 9 at the opposite end. The block or connecting head 1 is supported on the coupling by a hood 10, similar to the structure of the Shephard patent before referred to, such hood imparting additional strength to the structure. To support the head 2 vertically, the lower web of the head 1 is extended to form a longitudinal shelf 11, and the head 2 is provided with a rib 12, extending from its lower web, which rests on said shelf. This rib has a rounded face 13 disposed a slight distance from the longitudinal rib 4 of the lower web of the head 1 so as to be capable of partial rotative movement with respect to said head 1 as indicated by dotted lines. The knuckle portion of the head 2 is substantially the same shape as, but slightly smaller than, the knuckle portion of the normal Master Car Builders or Janney contour, as indicated, so as to readily engage couplers, having such contour, at various angles. This structure, it will be noted, is designed for making connections with couplings which are offset laterally with respect to each other and by having the parts movable with respect to each other the car couplings may readily change their relative lateral position without damage or danger of disengagement. As it is substantially a unitary structure and under the most favorable conditions of more or less great weight, I propose to lighten such weight as much as possible by making the parts 1 and 2 with single top and bottom webs, connected only at the coupling contours by the walls 14 and 15, respectively, and by the longitudinal wall 16.

I claim:—

1. The combination, in an auxiliary coupling, of two heads movably connected together and each formed for attachment to a standard coupling, one of said heads being laterally elongated and hollow with two straight ribs together forming a groove, the second head being substantially flat and having a pivot pin extending substantially at right angles to its plane within said groove of the first head so as to be both pivotally movable and bodily slidable therein.

2. The combination, in an auxiliary coupling, of two heads movably connected together and each formed for coöperation with a standard coupling, one of the heads being hollow and laterally elongated with ribs in said hollow portion forming a groove, the second head having a pivot pin operative within said groove so as to permit of its turning and also of its bodily movement, with a web at one end of the groove and a removable member at the other end thereon for limiting the bodily movement of the second head.

3. The combination, in an auxiliary coupling, of two heads each formed for coöperation with standard couplings, one of said heads having a hollow, laterally elongated portion open on the front of the head and formed with ribs placed to serve as a straight guideway transverse to the general line of the heads, the second head having a pivot pin revoluble in said guideway as well as bodily slidable therein, with a straight projecting ledge for the first head and a rib on the second head operative on said ledge for supporting said second head.

In testimony whereof, I have signed my name to this specification, in the presence of two subscribing witnesses.

CHARLES H. McLAUGHLIN.

Witnesses:
MURRAY C. BOYER,
WM. A. BARR.